United States Patent
Bird et al.

(10) Patent No.: US 9,858,270 B2
(45) Date of Patent: *Jan. 2, 2018

(54) CONVERTING DATA INTO NATURAL LANGUAGE FORM

(71) Applicant: INTERNATIONAL BUSINESS MACHINES CORPORATION, Armonk, NY (US)

(72) Inventors: John J. Bird, Rochester, MN (US); Doyle J. McCoy, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/426,717

(22) Filed: Feb. 7, 2017

(65) Prior Publication Data

US 2017/0147566 A1    May 25, 2017

Related U.S. Application Data

(63) Continuation of application No. 14/933,624, filed on Nov. 5, 2015, now Pat. No. 9,633,010, which is a continuation of application No. 13/350,107, filed on Jan. 13, 2012, now Pat. No. 9,251,143.

(51) Int. Cl.
*G06F 17/28* (2006.01)
*G06F 17/30* (2006.01)

(52) U.S. Cl.
CPC .... *G06F 17/2881* (2013.01); *G06F 17/30011* (2013.01); *G06F 17/30654* (2013.01)

(58) Field of Classification Search
CPC .................................................. G06F 17/2881
See application file for complete search history.

(56) References Cited

U.S. PATENT DOCUMENTS

| | | | |
|---|---|---|---|
| 4,610,025 A | 9/1986 | Blum et al. | |
| 4,776,011 A | 10/1988 | Busby | |
| 5,237,502 A | 8/1993 | White et al. | |
| 5,473,705 A * | 12/1995 | Abe | G06F 17/2872 382/100 |
| 5,572,670 A | 11/1996 | Puckett | |
| 5,594,658 A | 1/1997 | Lemaire et al. | |
| 5,634,084 A * | 5/1997 | Malsheen | G06F 17/273 704/260 |
| 5,689,565 A | 11/1997 | Spies et al. | |
| 5,692,206 A * | 11/1997 | Shirley | G06F 17/2881 706/902 |

(Continued)

*Primary Examiner* — Eric Yen
(74) *Attorney, Agent, or Firm* — Lisa Ulrich; Andrew M. Calderon; Roberts Mlotkowski Safran Cole & Calderon, P.C.

(57) ABSTRACT

Converting technical data from field oriented electronic data sources into natural language form is disclosed. An approach includes obtaining document data from an input document, wherein the document data is in a non-natural language form. The approach includes determining a data type of the document data from one of a plurality of data types defined in a detection and conversion database. The approach includes translating the document data to a natural language form based on the determined data type. The approach additionally includes outputting the translated document data in natural language form to an output data stream.

13 Claims, 5 Drawing Sheets

(56) References Cited

U.S. PATENT DOCUMENTS

| | | | |
|---|---|---|---|
| 5,737,442 A | 4/1998 | Alam | |
| 5,787,172 A | 7/1998 | Arnold | |
| 5,828,990 A * | 10/1998 | Nishino | G06F 17/289 704/2 |
| 5,835,690 A * | 11/1998 | Duniho | G06F 17/241 358/1.13 |
| 5,895,466 A | 4/1999 | Goldberg et al. | |
| 5,924,089 A | 7/1999 | Mocek et al. | |
| 5,951,623 A | 9/1999 | Reynar et al. | |
| 6,011,849 A | 1/2000 | Orrin | |
| 6,088,692 A | 7/2000 | Driscoll | |
| 6,111,953 A | 8/2000 | Walker et al. | |
| 6,198,885 B1 | 3/2001 | Budnik et al. | |
| 6,266,094 B1 | 7/2001 | Taylor, Jr. | |
| 6,278,996 B1 * | 8/2001 | Richardson | G06F 17/273 |
| 6,314,425 B1 | 11/2001 | Serbinis et al. | |
| 6,363,349 B1 * | 3/2002 | Urs | G10L 15/26 379/67.1 |
| 6,711,678 B2 | 3/2004 | Ferguson | |
| 6,741,705 B1 | 5/2004 | Nelson et al. | |
| 6,741,851 B1 | 5/2004 | Lee et al. | |
| 6,931,532 B1 | 8/2005 | Davis et al. | |
| 6,944,770 B2 | 9/2005 | Henderson et al. | |
| 6,952,691 B2 | 10/2005 | Drissi et al. | |
| 6,970,561 B1 | 11/2005 | Obana | |
| 7,010,681 B1 | 3/2006 | Fletcher et al. | |
| 7,269,741 B2 | 9/2007 | Matsui et al. | |
| 7,320,020 B2 | 1/2008 | Chadwick et al. | |
| 7,406,175 B2 | 7/2008 | Matsuda | |
| 7,484,107 B2 | 1/2009 | Forlenza et al. | |
| 7,502,466 B2 | 3/2009 | Shahindoust et al. | |
| 7,526,089 B2 | 4/2009 | Wada et al. | |
| 7,580,521 B1 | 8/2009 | Spies et al. | |
| 7,610,192 B1 * | 10/2009 | Jamieson | G06F 17/2229 704/1 |
| 7,634,175 B2 | 12/2009 | Seo et al. | |
| 7,680,649 B2 | 3/2010 | Park | |
| 7,707,027 B2 | 4/2010 | Balchandran et al. | |
| 7,730,298 B2 | 6/2010 | Huynh et al. | |
| 7,783,765 B2 | 8/2010 | Hildebrand et al. | |
| 7,814,127 B2 | 10/2010 | Dettinger et al. | |
| 7,826,611 B2 | 11/2010 | Farahat et al. | |
| 7,870,485 B2 | 1/2011 | Seliutin et al. | |
| 7,953,155 B2 | 5/2011 | Schwartz | |
| 8,121,997 B2 | 2/2012 | Raciborski | |
| 8,135,575 B1 * | 3/2012 | Dean | G06F 17/2845 704/2 |
| 8,135,620 B2 | 3/2012 | Barsade et al. | |
| 8,150,676 B1 * | 4/2012 | Kaeser | G06F 17/2881 704/1 |
| 8,200,247 B1 | 6/2012 | Starenky et al. | |
| 8,271,416 B2 | 9/2012 | Al-Beik et al. | |
| 8,520,849 B2 | 8/2013 | Iyer et al. | |
| 8,542,824 B2 | 9/2013 | Brown et al. | |
| 8,621,268 B2 | 12/2013 | Dhuse | |
| 8,694,646 B1 | 4/2014 | Kothari et al. | |
| 8,731,943 B2 | 5/2014 | Ruetz et al. | |
| 9,069,992 B1 | 6/2015 | Vaikar et al. | |
| 9,195,640 B1 * | 11/2015 | Donneau-Golencer | G06F 17/28 |
| 9,330,084 B1 * | 5/2016 | Kadambi | G06F 17/30654 |
| 2001/0034015 A1 | 10/2001 | Raichur et al. | |
| 2001/0056445 A1 * | 12/2001 | Meystel | G06F 17/2881 715/234 |
| 2002/0073310 A1 | 6/2002 | Benantar | |
| 2002/0087326 A1 * | 7/2002 | Lee | G06Q 30/06 704/270.1 |
| 2002/0145035 A1 * | 10/2002 | Jones | G06Q 20/04 235/379 |
| 2002/0169670 A1 | 11/2002 | Barsade et al. | |
| 2002/0188845 A1 | 12/2002 | Henderson et al. | |
| 2003/0041253 A1 | 2/2003 | Matsui et al. | |
| 2003/0059040 A1 | 3/2003 | Rose et al. | |
| 2003/0110076 A1 | 6/2003 | Holt | |
| 2003/0149686 A1 | 8/2003 | Drissi et al. | |
| 2003/0177378 A1 | 9/2003 | Wittkotter | |
| 2003/0191719 A1 | 10/2003 | Ginter et al. | |
| 2003/0191935 A1 | 10/2003 | Ferguson | |
| 2003/0223455 A1 | 12/2003 | Rashdan | |
| 2004/0101142 A1 | 5/2004 | Nasypny | |
| 2004/0103202 A1 | 5/2004 | Hildebrand et al. | |
| 2004/0161106 A1 | 8/2004 | Matsuda et al. | |
| 2004/0170328 A1 * | 9/2004 | Ladwig | G06K 9/74 382/217 |
| 2004/0210837 A1 | 10/2004 | Black et al. | |
| 2005/0033713 A1 * | 2/2005 | Bala | G06F 17/2881 706/59 |
| 2005/0137843 A1 * | 6/2005 | Lux | G06F 9/4448 704/2 |
| 2005/0177562 A1 | 8/2005 | Raciborski | |
| 2005/0198026 A1 * | 9/2005 | Dehlinger | G06F 17/2881 |
| 2006/0015733 A1 | 1/2006 | O'Malley et al. | |
| 2006/0020550 A1 | 1/2006 | Fields et al. | |
| 2006/0106609 A1 * | 5/2006 | Saito | G10L 13/00 704/260 |
| 2006/0178868 A1 * | 8/2006 | Billerey-Mosier | G06F 17/2881 704/9 |
| 2006/0253205 A1 * | 11/2006 | Gardiner | G06F 17/28 700/19 |
| 2007/0011608 A1 * | 1/2007 | Titemore | G06F 17/2229 715/209 |
| 2007/0050880 A1 | 3/2007 | Weisman et al. | |
| 2007/0118884 A1 | 5/2007 | Ozaki et al. | |
| 2007/0168891 A1 * | 7/2007 | Damery | G10L 13/00 715/865 |
| 2007/0258584 A1 | 11/2007 | Brown et al. | |
| 2007/0283446 A1 | 12/2007 | Yami et al. | |
| 2008/0028293 A1 | 1/2008 | Seliutin et al. | |
| 2008/0300012 A1 * | 12/2008 | An | H04N 21/4223 455/556.1 |
| 2009/0006432 A1 | 1/2009 | Bossong-Iselborn | |
| 2009/0060396 A1 * | 3/2009 | Blessan | G06K 9/6212 382/317 |
| 2009/0299726 A1 * | 12/2009 | Canu | G06F 9/4448 704/3 |
| 2009/0313209 A1 | 12/2009 | Lu et al. | |
| 2010/0017350 A1 | 1/2010 | Kar et al. | |
| 2010/0031240 A1 | 2/2010 | Drumm et al. | |
| 2010/0042572 A1 | 2/2010 | Al-Beik et al. | |
| 2010/0125616 A1 | 5/2010 | Groth | |
| 2010/0169303 A1 | 7/2010 | Biderman et al. | |
| 2010/0208282 A1 * | 8/2010 | Isaev | G06K 9/036 358/1.11 |
| 2010/0287001 A1 | 11/2010 | Pearce et al. | |
| 2010/0299139 A1 | 11/2010 | Ferrucci et al. | |
| 2011/0010349 A1 | 1/2011 | Ellingson et al. | |
| 2011/0038531 A1 | 2/2011 | Arasu et al. | |
| 2011/0182508 A1 * | 7/2011 | Ives | G06K 9/00442 382/164 |
| 2012/0192151 A1 | 7/2012 | Parkes et al. | |
| 2013/0114914 A1 * | 5/2013 | Dejean | G06K 9/00469 382/317 |
| 2014/0281935 A1 * | 9/2014 | Byron | G06F 17/245 715/249 |

* cited by examiner

| \multicolumn{3}{c}{Detection / Conversion Database 114} | | |
|---|---|---|
| Item | Item Name | Description |
| 401 | Section Type | What section does this item belong to? |
| 402 | Detection Group | What group of conversions does this belong to? |
| 403 | Pattern Match | How to detect this data type |
| 404 | Variable Pattern | How to find data of interest |
| 405 | Variable List | Names of variables to be found in the data |
| 406 | Translation Map | How to translate this pattern map |

FIG. 5

CONVERTING DATA INTO NATURAL LANGUAGE FORM

TECHNICAL FIELD

The present invention relates generally to submissions of technical data for application with machine-based question answering and, more particularly, to extraction and conversion of technical data from field oriented electronic data sources into natural language form.

BACKGROUND

Business analytics solutions mine through databases full of data looking for answers to business problems using data inputs that take various forms. A particular type of business analytics solution known as question-answering (QA) technology is a computer-based approach in which a computer application mines stored data in attempting to automatically answer questions.

A particular type of QA approach, known as DeepQA by IBM®, is a computer system that can directly and precisely answer natural language questions over an open and broad range of knowledge (IBM is a trademark of International Business Machines Corporation registered in many jurisdictions worldwide). DeepQA involves the integration and advancement of Natural Language Processing, Information Retrieval, Machine Learning, Knowledge Representation and Reasoning, and massively parallel computation to provide open-domain automatic question answering technology.

Natural language (or natural language form) is data that is arranged in sentences and paragraphs, e.g., similar to how paragraphs are arranged in a book, e.g., for human reading. Non-natural language form is data arranged in a form other than natural language form, and may comprise, for example, technical documents, information technology problem tickets, program defect reports, medical reports, software program test reports, database data, delimited data, etc. QA systems are adept at handling data sources that are in natural language form. However, when data sources are not natural language or are mixed sources including some natural language and some non-natural language sources, a QA system may be confused by the data and need specific programming for handling the non-natural language sources. This difficulty in handling non-natural language sources affects generic applicability of the QA approach.

A conventional technique for converting database data to natural language involves mail merge. Any particular mail merge solution, however, is disadvantageously constrained to supporting only a single database source, and to work only with pre-parsed data.

SUMMARY

In a first aspect of the invention, a method is implemented in a computer infrastructure and includes obtaining document data from an input document, wherein the document data is in a non-natural language form. The method also includes determining a data type of the document data from one of a plurality of data types defined in a detection and conversion database. The method also includes translating the document data to a natural language form based on the determined data type. The method also includes outputting the translated document data in natural language form to an output data stream.

In another aspect of the invention, a system is implemented in hardware which includes a processor executing a translation engine that is operable to obtain document data from an input document, wherein the document data is in a form other than a natural language form. The engine is also operable to determine a data type of the document data from one of a plurality of data types defined in records in a detection and conversion database. The engine is also operable to translate the document data to natural language form based on the determined data type. The engine is also operable to output the translated document data in natural language form to an output data stream.

In an additional aspect of the invention, a computer program product includes a computer usable tangible storage medium having readable program code embodied in the tangible storage medium. The computer program product includes at least one component operable to: obtain plural portions of document data from an input document, wherein the plural portions of document data are in a non-natural language form. For each one of the plural portions of document data, the at least one component performs the steps of: determine a data type of the one of the plural portions of document data from one of a plurality of data types defined in records in a detection and conversion database; translate the one of the plural portions of document data to a natural language form based on the determined data type; and output the translated one of the plural portions of document data in natural language form to an output data stream.

In another aspect of the invention, there is a computer system for translating an input document to a natural language form. The system includes a CPU, a computer readable memory, and a computer readable storage media. The system also includes first program instructions to obtain document data from an input document, wherein the document data is in a form other than a natural language form. The system includes second program instructions to determine a data type of the document data from one of a plurality of data types defined in records in a detection and conversion database. The system includes third program instructions to translate the document data to natural language form based on the determined data type. The system also includes fourth program instructions to output the translated document data in natural language form to an output data stream. The system also includes fifth program instructions to apply a keyword translation to the document data before and after the translating the document data to natural language form. The first, second, third, fourth, and fifth program instructions are stored on the computer readable storage media for execution by the CPU via the computer readable memory. Each one of the records in the detection and conversion database is associated with a respective one of the plurality of data types. Each one of the records comprises data for comparing against the document data during the determining. Each one of the records further comprises at least one conversion rule applied to the document data during the translating.

In a further aspect of the invention, there is a method of deploying a system for translating documents to natural language form. The method includes providing a computer infrastructure operable to: obtain document data from an input document, wherein the document data is in a non-natural language form; determine a data type of the document data from one of a plurality of data types defined in a detection and conversion database; translate the document data to a natural language form based on the determined data type; and output the translated document data in natural language form to an output data stream.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to submissions of technical data for application by machine-based question answering and, more particularly, to extraction and conversion of technical data from field oriented electronic data sources into natural language. In embodiments, a document containing non-natural language data is received as input (e.g., an input data stream) and is translated to natural language form. The input document may contain any type of free form and/or plain text information, such as, for example, technical documents, information technology problem tickets, program defect reports, medical reports, software program test reports, database data, etc. The result of the translation is one or more output documents in a natural language form which may be provided with entries identifying dates and times associated with particular elements and signatures of the original document.

In embodiments, the input document is parsed to determine types of information contained in the document. Different types of information are translated to natural language form using different conversion schemes, e.g., particular rules, patterns, constructs, etc., that are most suitable to the particular information type. The translation produces a viable natural language output document that is consumable for learning by a natural language engine. Implementations of the invention may be used as a front end to natural language learning engines, such as question-answering systems, for processing large quantities of parsed data in any order of arrival. Advantageously, embodiments of the invention may be implemented with a single translation database that is constructed to support translations of plural different document types presented in any order. In this manner, implementations of the invention may be used to provide question-answering (QA) systems with data in natural language form.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
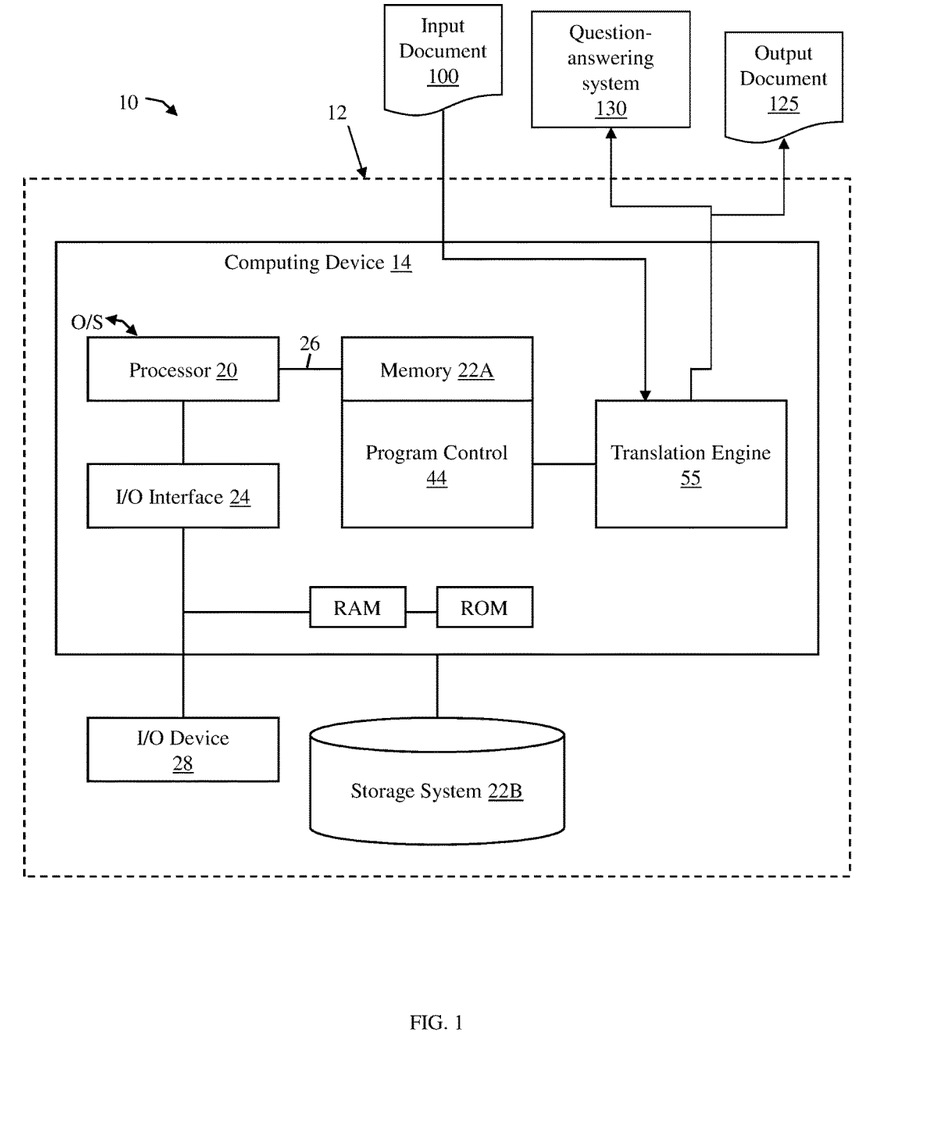
FIG. 1 shows an illustrative environment of a server and/or a computing device for implementing steps in accordance with aspects of the invention.

FIG. 1 shows an illustrative environment 10 for managing the processes in accordance with aspects of the invention. To this extent, the environment 10 includes a server or other computing infrastructure 12 that can perform the processes described herein. In particular, the computing infrastructure 12 includes a computing device 14. The computing device 14 can be resident on a network infrastructure or computing device of a third party service provider (any of which is generally represented in FIG. 1).

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be, for example, a handheld device, PDA, handset, keyboard, etc.

In general, the processor 20 executes computer program code (e.g., program control 44), which can be stored in the memory 22A and/or storage system 22B. Moreover, in accordance with aspects of the invention, the program control 44 controls a translation engine 55 that performs one or more of the processes described herein. In embodiments, the translation engine 55 operates to: receive data from an input document 100 that is in non-natural language form; determine a respective information type for respective portions of data contained within the input document; apply particular conversions to the portions of data based on the determined information type to translate the portions to natural language form; and output a new document 125 in natural language form.

Still referring to FIG. 1, the translation engine 55 can be implemented as one or more program code in the program control 44 stored in memory 22A as separate or combined modules. Additionally, the translation engine 55 may be implemented as separate dedicated processors or a single or several processors to provide the function of this tool. Moreover, it should be understood by those of ordinary skill in the art that the translation engine 55 is used as a general descriptive term for providing the features and/or functions of the present invention, and that the translation engine 55 may comprise many different components.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the computing infrastructure 12 comprises two or more computing devices (e.g., a server cluster) that communicate over any type of communications link, such as a network, a shared memory, or the like, to perform the process described herein. Further, while performing the processes described herein, one or more computing devices on the computing infrastructure 12 can communicate with one or more other computing devices external to the computing infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Processes

Figure 2:
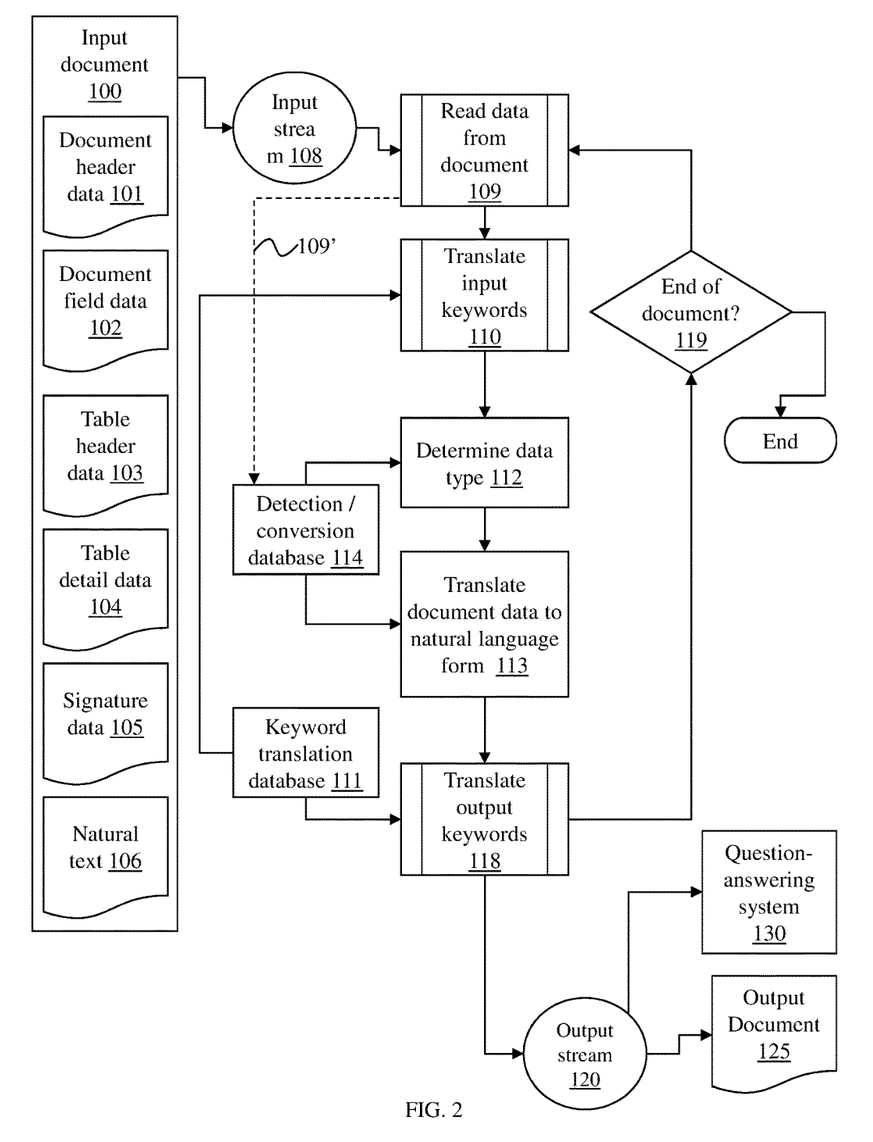
FIGS. 2-4 show flow and/or block diagrams for implementing steps in accordance with aspects of the invention.
Figure 3:
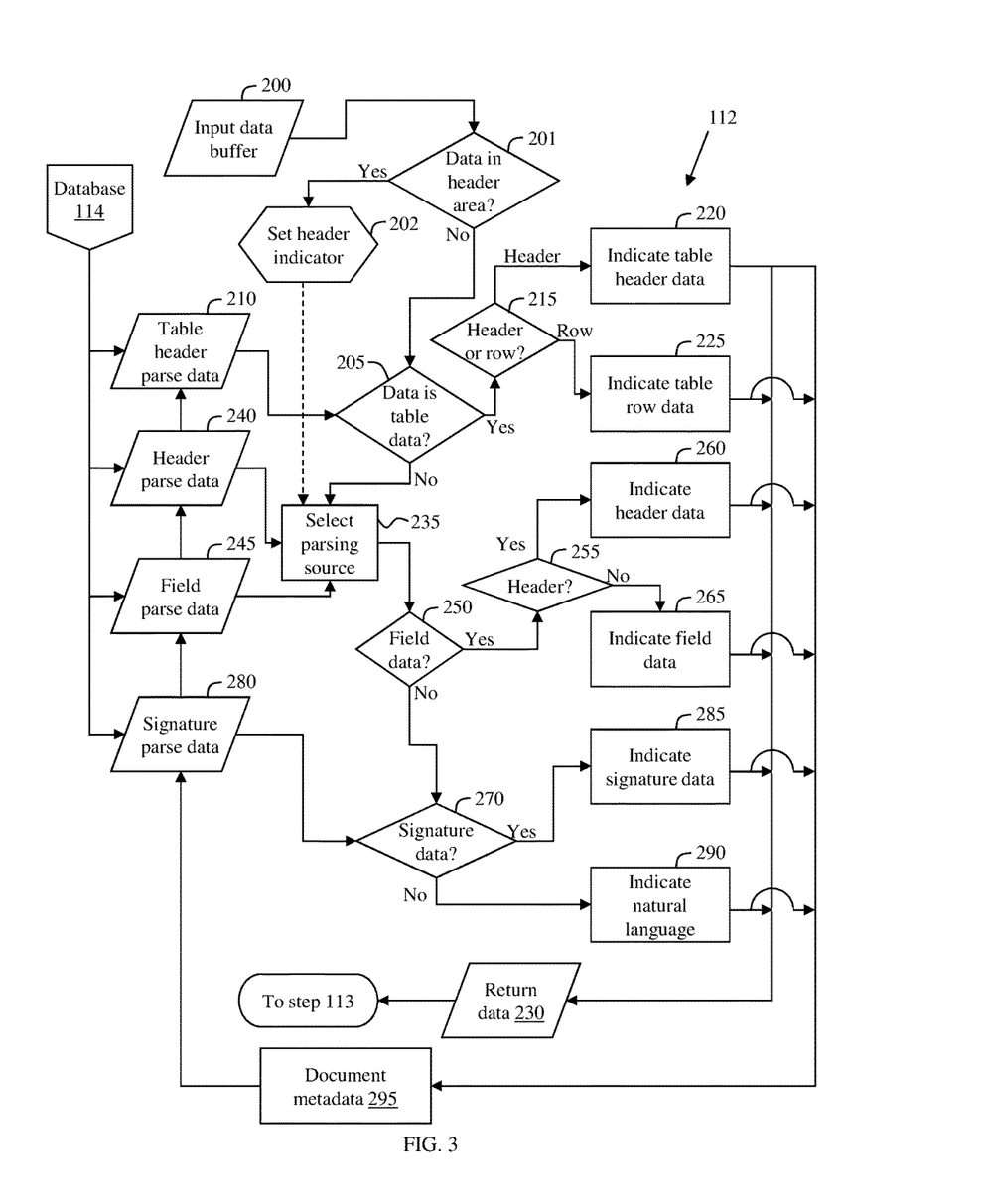
Figure 4:
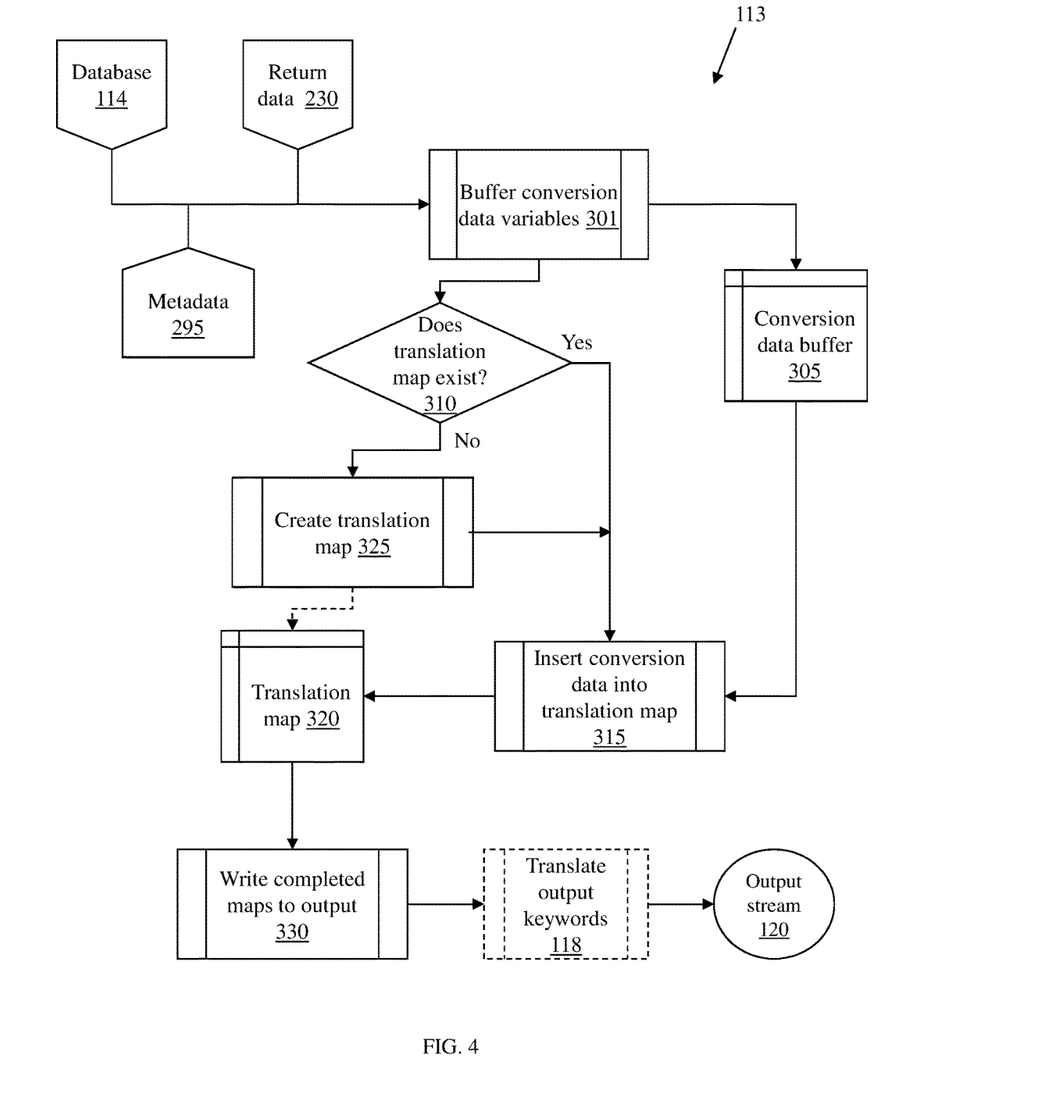

FIGS. 2-4 show exemplary flows for performing exemplary processes in accordance with aspects of the invention. The steps of FIG. 2-4 may be implemented in the environments of FIG. 1, for example.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 2 depicts a process of translating a non-natural language document into a natural language document in accordance with aspects of the invention. Input document 100 represents a document that is at least partially in non-natural language form. The input document 100 may include one or more different types of data including, but not limited to: document header data 101, document field data 102, table header data 103, table detail data 104, signature data 105, and natural text 106, which are described in greater detail herein. These data types 101-106 are merely exemplary and are not intended to limit the invention. For example, documents containing different data types than those shown (e.g., types 101-106) may be used within the scope of the invention, as can documents including more or less data types than the six described herein.

In embodiments, document header data 101 describes a section of the document 100 containing information such as a form type, document title, and other identifying information. Document field data 102 describes a section of the document 100 containing unique information about the document. The document field data 102 is associated with the contents of the document 100, as opposed to the document header data 101 which is associated with the header of the document 100.

There are multiple techniques to assess the difference between a document header and other elements of the document field in accordance with aspects of the invention. One technique is to establish an arbitrary point within the document 100 that differentiates between header and field data. Another technique is to detect information associated with the header, such as the document title, the type of the form, ownership, and other information that could be described as properties related to a document header. Another technique is to detect an 'end of header' marker, e.g., some particular information that is the last object contained in a document header.

In accordance with aspects of the invention, field data (e.g., database field data) may be associated with document header data 101 or document field data 102. Such field data may include at least two elements in which the first element is a name of the field and the second element is the data contained in the field. Field data contained in document 100 may additionally contain control information (e.g., delimiters) to identify the beginning of the name of the field, separate the field from the data it contains, and the end of the field data. If no such information exists, the data may be identified by the content types described in a detection/conversion database as described in greater detail herein.

Still referring to FIG. 2, table header data 103 comprises a section of the input document 100 that contains the headings of a row or column of a table (e.g., a database table or other tabular arrangement of data). For example, the table header data 103 may be the first row of a delimited data set across an input line. As another example, the table header data 103 may be spaced-apart headers aligned over columns of data.

Table detail data 104 is a section of the input document 100 containing the rows of table data. The table detail data 104 (also referred to herein as table field data) may comprise, for example, data delimited by one or more delimiters. The table detail data 104 may alternatively comprise columns of uniquely aligned data. In embodiments, the table detail data 104 is delimited and/or spaced apart in the same manner as the table header data 103.

The signature data 105 is a portion of the document 100 which comprises data within the document 100 such as an electronic signature or other type of signature. The signature data 105 may comprise, for example, a date, time, name (e.g., author of the document), and any other identifying data.

The natural text 106 of the input document 100 comprises text in natural language form, e.g., sentences arranged in paragraphs. Such data may or may not be translated at later steps of the process, and may be simply passed through to the output document. In this manner, implementations of the invention are useful for translating input documents 100 that are either completely composed of non-natural language, as well as input documents 100 that include a mixture of non-natural language and natural language data.

Input stream 108 comprises a stream of data generated from the input document 100 that is provided to the translation engine (e.g., translation engine 55 from FIG. 2). The input document may be converted to a data stream (e.g., input stream 108) in any suitable conventional manner, e.g., using data processing techniques.

At step 109, the translation engine (e.g., translation engine 55) reads data from the input stream 108 for analysis. The data read in step 109 may be stored in an input data buffer (e.g., a memory, which may be included in memory 22A and/or storage system 22B of FIG. 1) for access by the translation engine during later steps. The entire input document 100 or, alternatively, a smaller portion of the input document 100 may be read and saved into the input data buffer at step 109.

In embodiments, when the entire document 100 is not read into the input data buffer at step 109, then at step 109' the translation engine performs a preliminary query to a detection/conversion database 114. The preliminary query is made in order to determine a minimum amount of data for reading into the buffer at step 109 in order to successfully identify data types at later steps. At least one of the translation engine and the detection/conversion database 114 is provided with programming for determining how much document data is required for making a successful determination of data type prior to data translation to natural language form. In embodiments, when data is determined to have been partially parsed compared to what was read into the input data buffer, then the input data buffer continues to exist at an end loop such that more data may be appended to the input data buffer upon determination that more data needed the input data stream 108. When it is determined that insufficient data has been read at step 109, then more data is read from input stream 108 and added to the data stored in the input data buffer at step 109.

At step 110, the translation engine translates keywords, acronyms, and/or foreign language words contained in the data read at step 109. In embodiments, the translation engine compares words, phrases, and/or acronyms in the document data (e.g., data read at step 109) to entries contained in a keyword translation database 111. For any matching entries, the translation engine substitutes a word, phrase, and/or acronym in the data with a replacement word or phrase defined by the keyword translation database 111. In accordance with aspects of the invention, the keyword translation database 111 contains keyword, acronym, and/or foreign language translation records. Each record may comprise two elements: the first element containing a pattern to match in order to identify the data of interest, and the second element containing an output rule (e.g., replacement text) to generate a natural language output corresponding to the data being replaced.

At step 112, the translation engine (e.g., translation engine 55) determines a data type of the portion of document data contained in the input data buffer from step 109. At step 113, the translation engine translates the document data to a natural language form. In embodiments, steps 112 and 113 both involve the translation engine interacting with the detection/conversion database 114, which comprises: (i) detection data used in identifying different types of data, and (ii) translation data (e.g., rules, patterns, constructs, etc.) used in translating an identified data type into natural language form.

For example, at step 112, the translation engine uses document data retrieved from the input stream 108 and stored in the input data buffer at step 109 to perform a query of the detection/conversion database 114. In embodiments, the translation engine determines a data type corresponding to the document data in the input data buffer by comparing the document data in the input data buffer to views of the detection/conversion database 114. When a data type is determined, the appropriate conversion information records from the detection/conversion database 114 are marked for use in subsequent translation of the document data, as described in greater detail below with respect to FIG. 3.

Subsequently, at step 113, the translation engine applies translation data obtained from the detection/conversion database 114 to the document data to translate the document data to natural language form. The detection/conversion database 114 comprises plural different translation data corresponding to plural different data types, and the particular translation data used for a particular portion of document data is based on the determination of data type from step 112. Step 113 is described in greater detail below in FIG. 4.

In accordance with aspects of the invention, the detection/conversion database 114 contains data records that are used in steps 112 and 113 for identifying data types and translating the document data to a natural language form. In embodiments, each data record comprises first, second, and third elements. The first element defines the possible sections of the document in which a particular data type (e.g., data types 101-106) can be found. The first element can select multiple document sections at once so that the same conversion entry can be written for the same data when it exists in multiple sections of the input document 100.

The second element in each data record in the detection/conversion database 114 contains data, rules, and/or logic defining how to detect a match between one of the predefined data types (e.g., types 101-106) and a particular portion of data from the input document 100, e.g., a particular portion of the data saved in the buffer at step 109. For example, the second element may contain data, rules, and/or logic for calculating respective confidence levels that the particular portion of data from the input document 100 corresponds to respective ones of the predefined data types (e.g., types 101-106). The second element may additionally contain pattern matches including rules to determine partial matches. The second element may additionally contain rules to associate the element with a particular previously identified data type thus allowing data conversion to be context sensitive.

The third element in each data record in the detection/conversion database 114 contains conversion rules. In embodiments, the conversion rules are used at step 113 to translate the particular portion of data from the input document 100 to natural language form once the particular portion of data has been matched with one of the predefined data types (e.g., types 101-106). The conversion rules may contain both input rules as well as output rules. In embodiments, an input rule defines finding the data of interest and an associated output rule defines how to present that data in natural language form in a resultant output.

After translating the document data to natural language form at step 113, the translation engine optionally performs a second keyword translation at step 118. The translation at step 118 may be performed in the same manner as the translation at step 110. In embodiments, the second keyword translation, e.g., at step 118, is performed to replace any keywords, acronyms, foreign language words, etc., that are inserted into the document data during the translation at step 113.

Following the translation step 113 and the optional keyword translation step 118, the translation engine checks whether the end of document 100 has been reached at step 119 and concurrently places the translated data onto an output data stream 120. The determination of whether the end of the document 100 has been reached may be performed in a conventional data processing manner, e.g., by determining whether an end-of-document tag or identifier had been reached during the data reading step at 109. When the end of document 100 has not been reached, then the process returns to step 109 for reading more document data from the input stream 108. On the other hand, when the end of document has been reached, the process ends.

In accordance with aspects of the invention, the output data stream 120 comprises a stream of data in natural language form. More specifically, the output data stream 120 comprises a stream of data that has been translated from the input document 100 to a natural language form. In embodiments, the output data stream 120 may be saved as a natural language document 125 and/or provided to a question-answering system 130. In embodiments, the question-answering system 130 may comprise a DeepQA system by IBM®.

FIG. 3 shows details of step 112 from FIG. 2, e.g., determining data types (e.g., types 101-106) of data contained in the input document, in accordance with aspects of the invention. In FIG. 3, data 200 represents data in the input data buffer and corresponds to the data read at step 109 and translated at step 110 of FIG. 1. In embodiments, the data 200 is a portion of the entire input document 100, the extent of the portion (e.g., the beginning and end of the portion)

being determined by the translation engine using line breaks, page breaks, section breaks, or some other delimiter.

At step 201, the translation engine determines whether the data 200 is in a header area. In embodiments, the translation engine is programmed with logic to identify when the data 200 is in the header section of the document based on, for example: the position of the data 200 within the entire input stream (e.g., input stream 108), e.g., at the beginning of the input stream; whether a field or indicator within the input data stream has been passed, which may be stored as a flag in the structural header part of the input data buffer; whether a particular table has been encountered in the document header; and/or when an existing header indicator flag (described in greater detail below) is set to indicate that the header has already been identified and processed.

When it is determined at step 201 that the data 200 is in the header area, then at step 202 a header indicator flag is set to 'true'. The value of the header flag is used at step 235, as described in greater detail below.

On the other hand, when it is determined at step 201 that the data 200 is not in the header area, then at step 205 the translation engine determines whether the data 200 is table data. In embodiments, the translation engine uses programmed parsing techniques to identify whether a table is beginning or continuing at the point in the document corresponding to the data 200. The information relating to the table may be stored, for example, in structural data associated with the input data buffer. Table data in the document may exist in many different forms, and the translation engine is programmed with logic to parse the data for identifying the different forms. For example, a first form of table is equally spaced columns with one or more lines of header data at the top. A second exemplary form of table comprises a delimited field set such as where a first header row may be provided at the top while table data exists using the same delimiters below the first header row. Another exemplary form of table is delimited fields with the field names preceding the table data. A different delimiter may be used between the field name and the table field data from the delimiter used to separate the individual fields. Also, a delimiter may be used around the table data, and optionally around the field names to separate the field names from co-existing text of table data. In embodiments, the translation engine is programmed to recognize these forms, and other forms, of tables for making the determination at step 205.

When it is determined at step 205 that the data 200 is table data, then the translation engine queries the database 114 to obtain table header parse data 210, which is used to determine which output translation to apply to the data 200 at the translation step (e.g., step 113 from FIG. 2) later in the process. For example, upon obtaining the table header parse data 210, at step 215 the translation engine determines whether the data 200 is table header data or table field data by comparing the data 200 to the table header parse data 210. The table header parse data 210 allows the translation engine to identify unique table groups by comparing the table header parse data 210 to the data 200. In embodiments, the table header parse data 210 comprises one or more views into the database 114 that materialize only those records of the database 114 related to table header data. The records may contain source patterns for table headers that are used by the engine to identify columns in a table. In implementations where table data is stored with field names associated directly with the table data, the table parse data 210 may represent the table data as rows of data and specify parsing data to separate the headers.

In embodiments, the translation engine is programmed to handle multiple line headings when comparing table header data. For example, the data in the database 114 that is used to match table headers may be entered with full column headers in a single string. In this case, the translation engine reconstructs potential column headers of the data 200 into full column headers in a single string for comparing to the table header parse data 210. This function also permits the translation engine to store an indication of whether the header has already been parsed, e.g., to determine whether the table data is table header data (e.g., column data) or table row data.

For purposes of the translation engine querying data from database 114, this function may be programmed to return table header parse data 210 containing different forms of table data in ranked order. In this manner, multiple matching records may exist in the database 114, including across section types such as the header, table data, field data, signature data, etc. In embodiments, the translation engine may compare the rankings to determine which form of table has the highest likelihood of being the correct selection for the data 200, e.g., in a manner similar to ranked search results provided by Internet search engines. Additionally, table header data and table field data may be compared to designate whether an indication of table data overrides the rankings, e.g., giving table data a higher ranking for cases when a clear match was identified.

At step 215, when the data 200 is determined to be table header data, then at step 220 the translation engine saves an indicator designating the data 200 as table header data (e.g., table header data 103 from FIG. 2). On the other hand, when the data 200 is determined to be table row data, then at step 225 the translation engine saves an indicator designating the data 200 as table row data (e.g., table detail data 104 from FIG. 2). The indicator from step 220 or 225 is later used in the translation step (e.g., step 113 from FIG. 2) for applying a particular translation to the data 200. In embodiments, the indicator from step 220 or 225 is saved with the data 200 as return data 230, which is passed to the translation step. In further embodiments, when plural possible matching data types are identified from the table header parse data 240, the return data 230 also comprises a ranked list of the matching types of data (e.g., in descending order with the highest rank at the front of the list).

Referring back to step 205, when it is determined that the data 200 is not table data, at step 235 the translation engine selects a parsing source from header parse data 240 and field parse data 245. In embodiments, the header parse data 240 and field parse data 245 are views of the database 114 in a manner similar to table header parse data 210. The translation engine makes the determination at step 235 based on the value of the header indicator 202. For example, when the header indicator 202 is 'true' then at step 235 the translation engine selects the header parse data 240. On the other hand, when the header indicator 202 is 'false' then at step 235 the translation engine selects the field parse data 245.

At step 250, the translation engine determines whether the data 200 is field data. In embodiments, the translation engine is programmed to compare the data 200 to the parse data selected at step 235 (e.g., either header parse data 240 or field parse data 245) to determine whether the data 200 is provided as part of a field (e.g., document field data 102 from FIG. 2). The comparing may involve comparing the data 200 to plural different forms of document header data and document field data stored in the database 114 and returning a list of matches ranked in order of confidence of a matching data type.

When the data 200 is determined as field data at step 250, then at step 255 the translation engine determines whether the data 200 is also document header data (e.g., document header data 101 from FIG. 2). When the data 200 is determined to be document header data at step 255, then at step 260 the translation engine saves an indicator designating the data 200 as document header data (e.g., document header data 101 from FIG. 2). On the other hand, when the data 200 is determined to be document field data, then at step 265 the translation engine saves an indicator designating the data 200 as document field data (e.g., document field data 102 from FIG. 2). The indicator from step 260 or 265 is later used in the translation step (e.g., step 113 from FIG. 2) for applying a particular translation to the data 200. In embodiments, the indicator from step 260 or 265 is saved with the data 200 as return data 230, which is passed to the translation step. In further embodiments, when plural possible matching types of data are identified from the header parse data 240 or field parse data 245, the return data 230 also comprises a ranked list of the matching types of data (e.g., in descending order with the highest rank at the front of the list).

Referring back to step 250, when the data 200 is determined not to be field data, then at step 270 the translation engine determines whether the data 200 is signature data. In embodiments, the translation engine queries the database 114 for signature parse data 280, which comprises views of the database 114 in a manner similar to table header parse data 210. The translation engine is programmed to compare the data 200 to the signature parse data 280 to determine whether the data 200 is provided as part of a signature (e.g., signature entry data 105 from FIG. 2). The comparing may involve comparing the data 200 to plural different forms of signatures stored in the database 114 and returning a list of matches ranked in order of confidence.

When the data 200 is determined to be document signature data at step 270, then at step 285 the translation engine saves an indicator designating the data 200 as document signature data (e.g., signature entry data 105 from FIG. 2). On the other hand, when the data 200 is determined not to be document signature data, then at step 290 the translation engine saves an indicator designating the data 200 as natural language data (e.g., natural text 106 from FIG. 2). The indicator from step 285 or 290 is later used in the translation step (e.g., step 113 from FIG. 2) for applying a particular translation to the data 200. In embodiments, the indicator from step 285 or 290 is saved with the data 200 as return data 230, which is passed to the translation step. In further embodiments, when plural possible matching types of data are identified the from the signature parse data 280, the return data 230 also comprises a ranked list of the matching types of data (e.g., in descending order with the highest rank at the front of the list).

Thus, as depicted and described with respect with FIG. 2, the translation engine designates the data 200 as: table header data, table field data, document header data, document field data, signature data, and/or natural text. The data 200 and the indicator defining the designated data type are saved together as return data 230, along with ranked lists of possible matches, if any. The return data 230 is then passed to the translation step 113, as described generally with respect to FIG. 2 and in more detail below with respect to FIG. 4.

In additional embodiments, following the designation at one of steps 220, 225, 260, 265, 285, and 290, the translation engine saves document metadata 295 to appropriate views of the database 114, e.g., table header parse data 210, header parse data 240, field parse data 245, and signature parse data 280. The document metadata 295 describes, for example, the document title, date, and any other identifying information about the input document 100. In embodiments, the document metadata 295 is input to the various views of the database 114 for use in later comparisons of other data, e.g., to qualify the output data of those views for more concise data type selections based on document type and other metadata.

FIG. 4 shows details of step 113 from FIG. 2, e.g., translating the portions of document data based on the data type determined at step 112. In FIG. 4, return data 230 and metadata 295 represent the return data and metadata described above with respect to FIG. 3. In embodiments, the translation engine uses the return data 230 and metadata 295 in conjunction with queries of the database 114 to translate (e.g., convert) portions of the document data into natural language form and generate the output stream 120.

At step 301, the translation engine identifies and stores conversion data variables found from the database 114 and the return data 230. In embodiments, the translation engine identifies the conversion data variables by analyzing the return data 230 and database 114 indicating the data type associated with the return data 230, e.g., as previously determined at step 112. The translation engine stores the conversion data variables in a conversion data buffer 305 as an internal table during the conversion (e.g., translation) process. In embodiments, the table contains the identity of the conversion data variables, an ordinal count to indicate which element of a sequential construct to which it belongs, a value of the conversion data variable, and an identity of the detection record from the database 114 in which the conversion data variable was found, e.g., so that matching translation maps (described herein) may be used in the conversion process.

In embodiments, the engine may process plural portions of return data 230 at the same time. Accordingly, step 301 may comprise, where applicable for tables and other repetitive data types, storing an order of the conversion data variables in conjunction with the conversion data variables to preserve order integrity of the stream of return data 230.

At step 310, the translation engine determines whether a translation map exists for the return data 230. In embodiments, the translation engine examines the return data 230 and record from the database 114 to determine if a translation map exists for the data, e.g., determining whether the database 114 contains rules and/or logic for translating the data type of the return data 230 to natural language form.

When it is determined that a translation map exists, at step 315 the translation engine inserts conversion data into the existing translation map. In embodiments, the translation engine scans the conversion data buffer 305 for saved conversion data variables (e.g., saved at step 301) containing the conversion variable name that matches an existing a translation map. When a match is found, the translation engine inserts the conversion data variables into the translation map data structure 320 at the appropriate location as defined by the order of the conversion data variables.

In embodiments, the translation map data structure 320 is a comprehensive data structure containing respective translation rules and/or logic that have been identified as corresponding to the return data 230 based on the determined type of return data 230. The translation map data structure 320 may also contain an identifier linking a particular translation rule with a portion of the return data 230 to be converted using the particular translation rule, e.g., as defined in conversion data buffer 305. As such, the translation map data structure 320 is the data structure used to convert the return data 230 to natural language form by applying respective translation rules and/or logic to respective portions of the return data 230.

Referring back to step 310, when a translation map does not exist for a portion of return data 230, then at step 325 the translation engine creates a new translation map associated with this portion of return data 230 and appends the new translation map to the existing translation map data structure 320. A translation map may not exist for a portion of the return data 230, for example, when the data type could not be determined to a minimum confidence level at step 112 (e.g., described with respect to FIGS. 1 and 2). For example, the engine may determine that a portion of data may be one of many data types, with no data type having a confidence level greater than a predetermined minimum threshold. In such circumstances, the translation engine may select the data type having the greatest confidence level and assign that data type to data having the form of the respective portion of return data 230, thereby creating a new translation map for this form of return data at step 325. Following generation of a new translation map and appending the new translation map to the translation map data structure at step 325, the translation engine proceeds to step 315 and inserts the conversion data into the translation map data structure 320 in the manner already described herein.

At step 330, the translation engine writes the completed translation maps to an output. For example, the engine may write the completed translation maps directly to the output stream 120. Optionally, as described above, a second keyword translation step 118 may be applied to the output of step 330. In accordance with aspects of the invention, the data written to the output at step 330 is the document data translated to natural language form.

In embodiments, the translation engine writes the data to the output stream 120 in the same order as the data is arranged in the input document (e.g., input document 100). For example, the conversion data buffer 305 and the translation map data structure 320 are arranged to hold plural portions of data in order according to the input document, and the translation engine writes the plural portions of data to the output stream 120 when all of the plural portions of data are translated. In particular, the conversion data buffer 305 and the translation map data structure 320 hold the data such that it is flushed to the output stream in the order received, thus preserving the order of table data. Additionally, table data is parsed (e.g., at step 203 from FIG. 3) and stored in the conversion data buffer 305 along with such elements as a row number or translation map number to ensure that the data from a row in the table reaches the output stream 120 in the appropriate order.

In accordance with aspects of the invention, the translation engine is configured such that writing to the output stream 120 ends when an incomplete translation map entry is found. In embodiments, incomplete entries are those whose variables are not all assigned from the conversion data buffer 305. Upon completion of the entire document translation process, those maps which are incomplete are written to the output stream 120 with associated error messages describing the missing elements.

Figure 5:
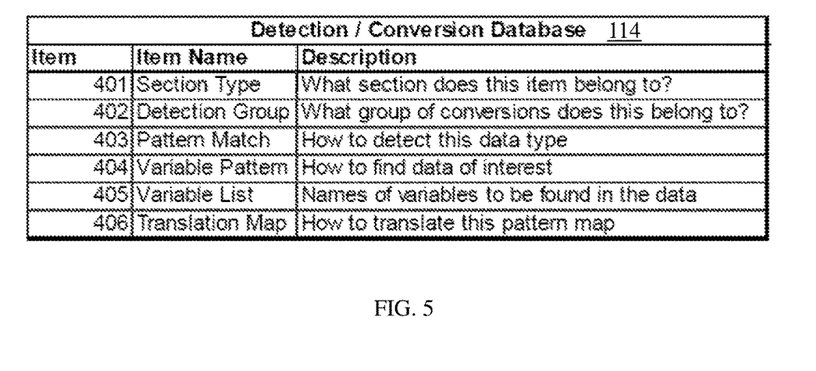
FIG. 5 depicts aspects of an exemplary detection/conversion database in accordance with aspects of the invention.

FIG. 5 depicts exemplary records contained in the database 114 in accordance with aspects of the invention. The database 114 may comprise, for example, an XML (Extensible Markup Language) document repository, an SQL (Structured Query Language) database, or any other suitable database capable of performing the functions described herein. Items 401-406 are exemplary data description structures and the database 114 may contain more or less information and different types of descriptions within the scope of the invention.

In embodiments, Section Type 401 is an ordinal set entry describing the sections of the input document (e.g., input document 110) to which this particular record applies. Detection Group 402 is an ordinal entry naming a group to which this detection/conversion record belongs. In embodiments, only those items with the same detection group are converted as a group of entries together. Also, the detection group may be used to indicate specific articulated information such as the name of a document or other uniquely identifying information.

Pattern Match 403 describes how to detect a particular data type in the input document. In embodiments, this record is a combination of expressions that describe specific words, strings, numbers, and/or other data types found within a data string. This record may also describes an order of the data, potential lengths of data types, including ranges of lengths, or sets of data, such as may be described by a regular expression.

Variable Pattern 404 describes how to detect variables in the data of this data type. Implementations of the invention may provide for a combined pattern detection as well as variable detection mechanism. In embodiments, the same pattern matching scheme may be assigned to either elements or the same element of the record.

Variable List 405 defines names applied to the elements such that the data of interest can be extracted and stored in the conversion data buffer (e.g., conversion data buffer 305). Translation Map 406 describes variables for a group that must exist for the translation map may be written to output, as well as the formatting of those variables and the natural language to be used in describing the output. In embodiments, Translation Map 106 is an optional section, e.g., it may be null. In further embodiments, at least one translation map exists for each Detection Group 402 that is defined in the database 114.

The methods and system described herein may be used to convert multiple different types of input documents (e.g., input document 100) to natural language form using a single database (e.g., database 114). Additionally, methods and systems of the invention do not require specifically positioned field data within the input document, since the translation engine (e.g., translation engine 55) may use expressions to find data within the document. Furthermore, methods and systems in accordance with aspects of the invention provide the ability to collect metadata that is useful in narrowing and improving the precisions of the search for data in the database. Even further, the methods and system described herein have provide the ability to convert table data in order of storage in the table, as well as handling plural different formats of tables without user intervention.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Many modifications and variations will be apparent to those of ordinary skill in the art without departing from the scope and spirit of the invention. The corresponding structures, materials, acts, and equivalents of all means or step plus function elements in the claims, if applicable, are intended to include any structure, material, or act for performing the function in combination with other claimed elements as specifically claimed. Accordingly, while the invention has been described in terms of embodiments, those of skill in the art will recognize that the invention can be practiced with modifications and in the spirit and scope of the appended claims.

What is claimed is:

1. A method implemented in a computer infrastructure, comprising:
    obtaining document data from an input document;
    determining, using a translation engine, a data type of the document data out of a plurality of data types using a detection and conversion database;
    selecting, based on the determined data type, appropriate conversion information records from translation data stored in the detection and conversion database;
    translating, using the translation engine and the appropriate conversion information records, based on the determined data type, the document data to a natural language form;
    outputting, in natural language form, the translated document data to an output data stream, wherein the plurality of data types comprises a document header data; a document field data; a table header data; a table detail data; and a signature data;
    applying a first keyword translation to the document data; and
    applying a second keyword translation to the translated document data after the translating the document data to the natural language form.

2. The method of claim 1, wherein the obtaining comprises obtaining, from an input data stream of the input document, the document data.

3. The method of claim 1, wherein the applying the first keyword translation to the document data occurs prior to the translating the document data to the natural language form.

4. The method of claim 1, wherein the first and second keyword translations are applied using a keyword translation database.

5. The method of claim 1, further comprising providing the output data stream to a question-answering system.

6. The method of claim 1, further comprising saving the output data stream as an output document.

7. The method of claim 1, wherein:
    the document data comprises plural different portions of data; and
    the determining, the translating, and the outputting are respectively performed for each respective one of the plural different portions of data.

8. The method of claim 7, wherein:
    the plural different portions of data are arranged in an order in the input document; and
    the output translated document data comprises translated portions of data in the same order as the input document.

9. The method of claim 7, further comprising storing metadata associated with each one of the plural different portions of data.

10. A system implemented in hardware, comprising:
    a processor executing a translation engine that is configured to:
        obtain document data that is in a form other than a natural language from an input document;
        determine, via communication with a detection and conversion database, a data type of the document data;
        translate, based on the determined data type and appropriate conversion information records selected from plural different translation data stored in the detection and conversion database, the document data to natural language; and
        output, in natural language, the translated document data to an output data stream, wherein:
            each record is associated with one of a plurality of data types which comprise: a document header data; a document field data; a table header data; a table detail data; and a signature data; and
            each record comprises:
                data used in comparisons against the document data during the determining; and
                at least one conversion rule applied to the document data during the translating.

11. The system of claim 10, wherein:
    the translation engine is further operable to apply a keyword translation at least one of prior to and after the translating the document data to natural language; and
    the keyword translation is a separate translation from the translating the document data to the natural language.

12. The system of claim 10, wherein the translation engine is further operable to provide the output data stream to a question-answering system, wherein the output stream includes a translation map.

13. A computer program product comprising a non-transitory computer usable tangible storage medium having readable program code embodied in the tangible storage medium, the computer program product includes at least one component configured to:
    obtain portions of document data that are in a non-natural language form from a document; and
    for the portions, perform the steps of:
        determine, through a detection and conversion database, a data type for each portion out of a plurality of data types;
        applying a first keyword translation to each portion;
        translate, based on the determined data type, each portion to a natural language form, wherein the plurality of data types comprises: a document header data; a document field data; a table header data; a table detail data; and a signature data; and
        applying a second keyword translation to the translated portion after the translating each portion to the natural language form.

* * * * *